(12) United States Patent
Barkley et al.

(10) Patent No.: US 7,716,551 B2
(45) Date of Patent: May 11, 2010

(54) FEEDBACK AND FRAME SYNCHRONIZATION BETWEEN MEDIA ENCODERS AND DECODERS

(75) Inventors: Warren V Barkley, Mill Creek, WA (US); Regis J. Crinon, Camas, WA (US); Chih-Lung (Bruce) Lin, Redmond, WA (US); Tim M Moore, Bellevue, WA (US); Wei Zhong, Issaquah, WA (US); Minghui (Jason) Xia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1189 days.

(21) Appl. No.: 11/275,071

(22) Filed: Dec. 7, 2005

(65) Prior Publication Data

US 2007/0130493 A1    Jun. 7, 2007

(51) Int. Cl.
*H04L 1/00* (2006.01)
*H04N 1/32* (2006.01)

(52) U.S. Cl. ........................................ 714/748; 386/66
(58) Field of Classification Search ................. 714/748; 386/66
See application file for complete search history.

(56) References Cited

U.S. PATENT DOCUMENTS

| | | | |
|---|---|---|---|
| 5,444,489 A | | 8/1995 | Truong et al. |
| 5,999,173 A | * | 12/1999 | Ubillos ........................ 715/724 |
| 6,580,767 B1 | | 6/2003 | Koehler et al. |
| 6,760,749 B1 | | 7/2004 | Dunlap et al. |
| 7,007,062 B1 | * | 2/2006 | Serenyi et al. ............... 709/203 |
| 7,174,561 B2 | * | 2/2007 | Bixby et al. ................... 725/93 |
| 7,237,061 B1 | * | 6/2007 | Boic .......................... 711/113 |
| 2003/0169815 A1 | * | 9/2003 | Aggarwal et al. ...... 375/240.12 |
| 2004/0016000 A1 | * | 1/2004 | Zhang et al. ................. 725/143 |
| 2004/0042547 A1 | * | 3/2004 | Coleman ............... 375/240.01 |
| 2004/0125816 A1 | * | 7/2004 | Xu et al. ...................... 370/411 |
| 2005/0257239 A1 | * | 11/2005 | Evans et al. ................... 725/88 |
| 2006/0146830 A1 | | 7/2006 | Lin et al. |
| 2006/0291560 A1 | * | 12/2006 | Penna et al. ........... 375/240.16 |
| 2007/0008323 A1 | * | 1/2007 | Zhou .......................... 345/475 |
| 2007/0064811 A1 | * | 3/2007 | Zador et al. ............. 375/240.26 |
| 2007/0133951 A1 | * | 6/2007 | Flecchia ...................... 386/112 |

FOREIGN PATENT DOCUMENTS

WO    WO0184732 A1    11/2001

OTHER PUBLICATIONS

PCT Search Report for PCT Application No. PCT/US2006/046221 mailed Apr. 18, 2007 (9 pages).

* cited by examiner

*Primary Examiner*—Stephen M Baker
(74) *Attorney, Agent, or Firm*—Lee & Hayes, PLLC (57) ABSTRACT

Feedback and frame synchronization between media encoders and decoders is described. More particularly, the encoder can encode frames that are based on source content to be sent to the decoder. The encoder can determine whether the frame should be cached by the encoder and the decoder. If the frame is to be cached, the encoder can so indicate by encoding the frame with one or more cache control bits. The decoder can receive the frame from the decoder, and can examine the cache control bits to determine whether to cache the frame. The decoder can also decode the frame.

20 Claims, 6 Drawing Sheets

FEEDBACK AND FRAME SYNCHRONIZATION BETWEEN MEDIA ENCODERS AND DECODERS

BACKGROUND

Various forms of media coders and decoders enable media to be transmitted from point to point within networks. Cooperating sets of coders and decoders are referred to as "codecs" herein. Additionally, the terms "coder" and "encoder" are used herein synonymously.

Typically, the encoder may interact or cooperate with a number of decoders. All of these decoders may or may not be configured alike, or have the same processing capabilities. Additionally, the decoders are typically not configured to provide the encoder with information such as the properties, features, or capabilities of particular ones of the decoders. In this environment, the encoders may send data to the decoders as if all of the decoders are homogenous entities, when the decoders may not be.

Networks typically represent lossy channels, such that some amount of data transmitted via such networks is expected to be corrupted, damaged, or lost altogether. Various schemes for recovering from such data loss or corruption have been proposed. Some of these recovery schemes may involve resending entire duplicates of the lost or damaged data. Accordingly, these recovery schemes may unnecessarily consume network bandwidth.

SUMMARY

Systems and/or methods ("tools") are described that enable feedback and frame synchronization between media encoders and decoders. More particularly, the encoder can encode frames that are based on source content to be sent to the decoder. The encoder can determine whether the frame should be cached by the encoder and the decoder. If the frame is to be cached, the encoder can so indicate by encoding the frame with one or more cache control bits. The decoder can receive the frame from the decoder, and can examine the cache control bits to determine whether to cache the frame. The decoder can also decode the frame.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes system(s) and/or method(s) ("tools") capable of many techniques and processes. The following discussion describes exemplary ways in which the tools enable feedback and frame synchronization between media encoders and decoders. This discussion also describes ways in which the tools perform other techniques as well.

This document is organized into sections for convenience, with the sections introduced by headings chosen for convenience, but not limitation. First, an illustrative Operating Environment for performing feedback and frame synchronization between media encoders and decoders is described. Then, illustrative Data Structures are described, followed by illustrative Data Flows. Finally, illustrative Process Flows are described.

The terms "packet" and "frame" are used herein for convenience of illustration and discussion. For further convenience, it can be assumed that all frames can fit into the payload of one packet, and therefore that the number of packets equals the number of frames when discussing the demarcation of a given frame and the next frame.

Operating Environment

Before describing the tools in detail, the following discussion of an exemplary operating environment is provided to assist the reader in understanding one way in which various aspects of the tools may be employed. The environment described below constitutes but one example and is not intended to limit application of the tools to any one particular operating environment. Other environments may be used without departing from the spirit and scope of the claimed subject matter.

Figure 1:
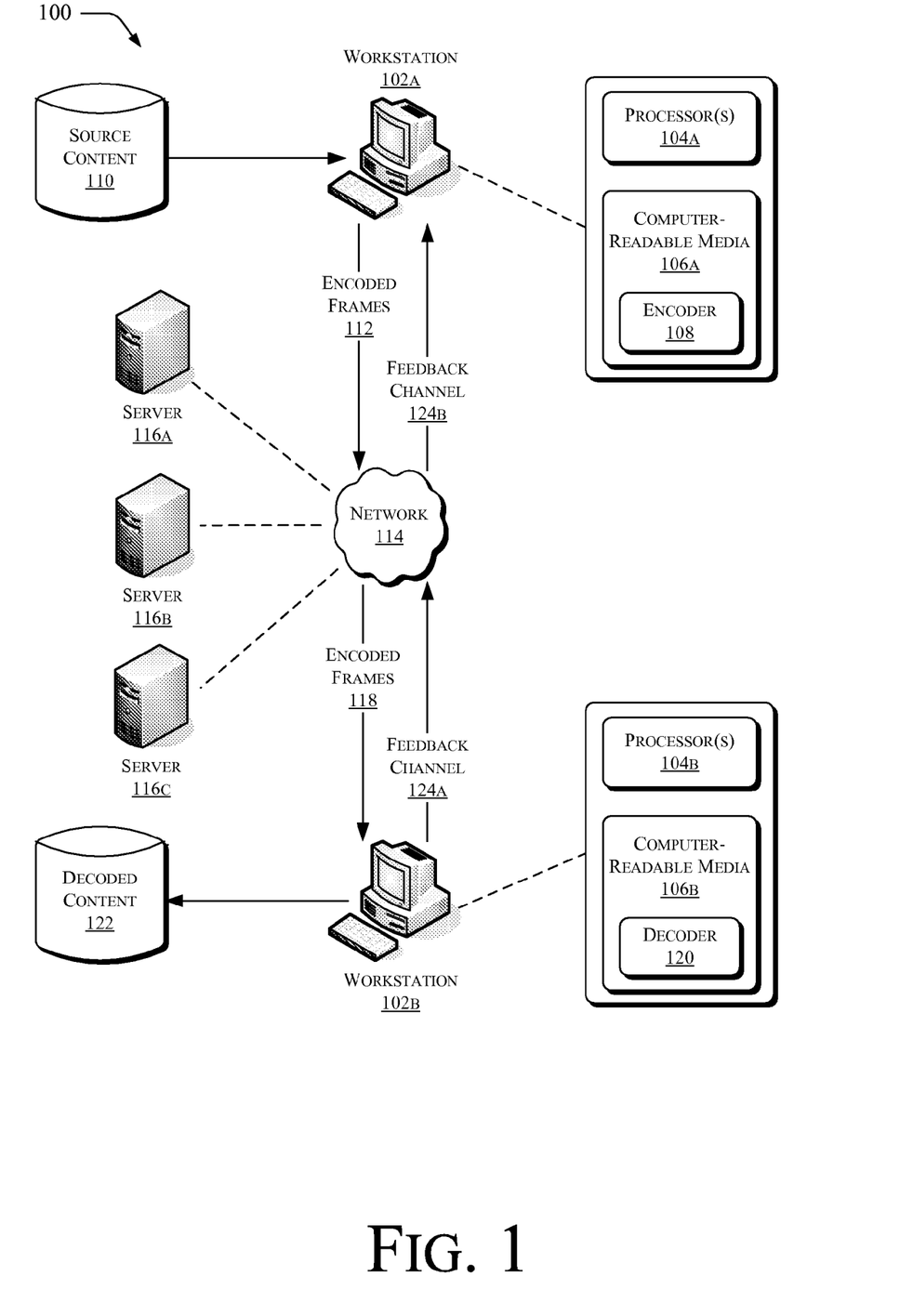
FIG. 1 is a block diagram illustrating an operating environment suitable for performing feedback and frame synchronization between media encoders and decoders.

FIG. 1 illustrates one such operating environment generally at 100. The operating environment 100 can comprise a workstation 102a having one or more processor(s) 104a and computer-readable media 106a. The workstation 102a can comprise a computing device, such as a cell phone, desktop computer, personal digital assistant, server, or the like. The processor 104a can be configured to access and/or execute the computer-readable media 106a. The computer-readable media 106a can comprise or have access to an encoder 108, which may be implemented as a module, program, or other entity capable of interacting with a network-enabled entity.

The encoder 108 can be operative to encode source content 110 into a plurality of corresponding frames 112. The source content 110 can assume any number of different forms, such as a live presentation featuring a speaker or other performer. The source content 110 can be a video and/or audio conference. Finally, the source content 110 can be pre-existing or pre-recorded media, such as audio or video media.

The operating environment 100 can also comprise a network 114 and related server(s) 116. The network 114 enables communication between the workstation 102 and the server(s) 116, and can comprise a global or local wired or wireless network, such as the Internet or a corporate intranet. It is understood that the encoder 108 can be operative to encode the source content 110 into the frames 112 using a protocol that is appropriate for transmission over the network 114.

The server(s) 116 can comprise a single server or multiple servers, such as a server farm, though the server(s) 116 may also comprise additional server or non-server entities capable of communicating with other entities or of governing the individual servers (e.g., for load balancing). The server(s) 116 are shown with three separate servers 116a, 116b, and 116c operating serially or in parallel to service requests from, for example, the workstations 102.

The network 114 can be operative to transmit the frames 112 from the workstation 102a to at least one additional workstation 102b. It is understood that the network 114 may not transmit all of the frames 112 perfectly from the workstation 102a to the workstation 102b. Accordingly, the reference 112 in FIG. 1 represents the frames as they leave the workstation 102a, and the reference 118 represents the frames as they emerge from the network 114 and are provided to the workstation 102b. Some frames 112 may be lost, distorted, or otherwise corrupted during transmission through the network 114, as compared to the frames 118. Accordingly, if some of the frames 112 are lost, then the received frames 118 may be viewed as a subset of the sent frames 112. Also, if some of the frames 112 are corrupted, then the received frames 118 may be viewed as the sent frames 112 in a corrupted state.

Turning to the workstation 102b in more detail, it may be implemented similarly to the workstation 102a described above. Thus, the workstation 102b can include processor(s) 104b and computer-readable media 106b. The computer-readable media 106b can comprise or have access to a decoder 120.

The decoder 120 can be operative to receive and decode the frames 118 as received from the workstation 102a via the network 114. The decoder 120 would use the same protocol to decode the frames 118 as was used previously by the encoder 108 to encode the frames 112. If the decoder 120 determines that the frames 118 are not corrupted, damaged, or lost, relative to the frames 112, then the decoder can decode these frames 118 into decoded content 122.

The decoded content 122 represents the source content 110 as reproduced on the workstation 102b. For example, if the source content 110 is a live presentation, the decoded content 122 could represent the presentation as displayed via the workstation 102b. If the source content 110 is a spoken conference-related audio or video stream, the decoded content 122 may be that audio or video stream as heard or seen by another conference participant. As another example, if the source content 110 is pre-existing or pre-recorded media, the decoded content 122 could represent the media as displayed via the workstation 102b.

In providing the above description, it is understood that the operating environment 100 is not limited to a unidirectional nature. Instead, the workstation 102a may transmit certain source content 110 at some times, while the workstation 102b may transmit other source content 110 at other times. Thus, the data flows shown in FIG. 1 and other Figures herein are illustrative only, and not limiting.

Returning to the processing of the decoder 120, if the decoder 120 determines that some of the frames 118 were corrupted or damaged during transmission through the network 114, or that some of the frames 112 were lost and never arrived at the workstation 102b, the decoder 120 can report accordingly to the encoder 108. More particularly, the decoder 120 can report to the encoder 108 using a feedback channel 124. The feedback channel 124 can be implemented, at least in part, using the network 114, although the protocol used to encode and/or transmit data via the feedback channel 124 may or may not be the same as the protocol used to encode and/or transmit the frames 112 and 118. Data moving through the feedback channel 124 via the network 114 is represented by the references 124a and 124b. Due to errors in the network or other issues, the data 124a and 124b may differ somewhat, for the same reasons as the frames 112 may differ from the frames 118.

Having received a report of lost, damaged, or otherwise corrupted frames 112 or 118, the encoder 108 can transmit corrected or replacement frames 112 to the decoder 120. It is understood that this process of reporting damaged frames and transmitting corrected or replacement frames 112 can be repeated until the decoder 120 has the information appropriate to decode the frames 118, so as to produce the decoded content 122 on the workstation 102b.

Additional aspects of the feedback channel 124 as used to report frame losses are described in further detail below. However, the feedback channel 124 may also enable the decoder 120 to communicate information about itself, its configuration, or other relevant parameters back to the encoder 108. Given this information about the decoder 120, the encoder 108 can adjust or optimize its encoding process accordingly. These aspects of the feedback channel 124 as used to report information about the decoder 120 are also described further below. In light of the foregoing description, the feedback channel 124 may provide the decoder(s) 120 with an out-of-band channel to communicate with the encoder 108.

It is understood that only one workstation 104b and related decoder 120 is shown in FIG. 1 only for clarity and legibility, and not to limit possible implementations of the operating environment 100. In particular, it is noted that any number of different workstations 104b and corresponding decoders 120 could be included, with different ones of the workstations 104b and decoders 120 having different configurations, features, capacities, capabilities, or other characteristics. For example, different workstations 104b might support different color depths, pixel resolutions, display sizes, or other aspects of processing the source content 110 and/or the decoded content 122. It is further understood that each workstation 104b and/or decoder 120 could have a respective feedback channel 124. Using this feedback channel 124, the workstations 104b and/or decoders 120 can provide specific local information germane to their local environments back to the encoder 108.

Data Structures

The tools described and illustrated herein may utilize data structures as part of their implementation and/or operations to perform feedback and frame synchronization between media encoders and decoders. Examples of such data structures are now described.

Figure 2:
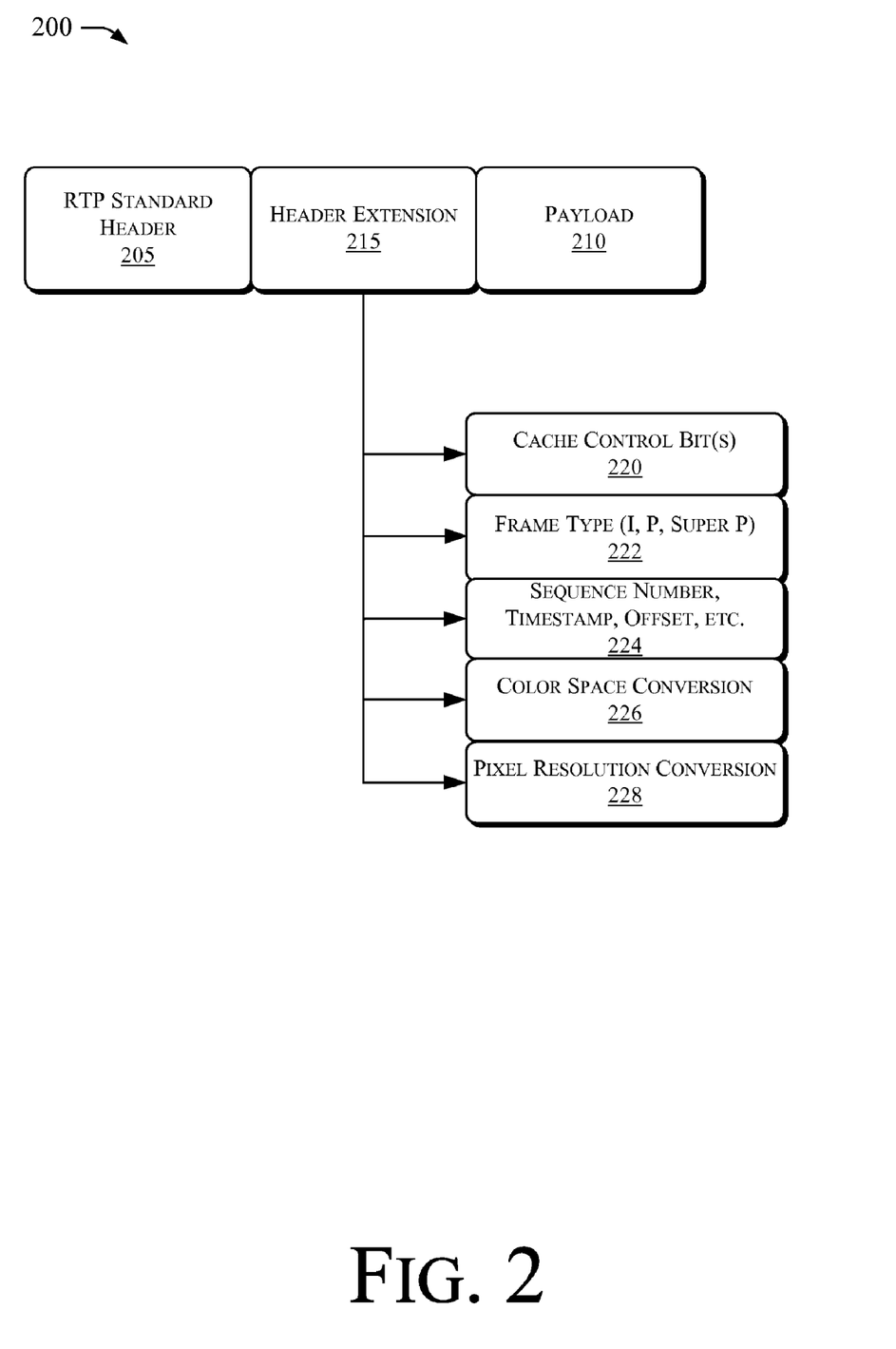
FIG. 2 is a block diagram illustrating a data structure, at least parts of which may be suitable for implementing respective instances of frames as shown in FIG. 1.

FIG. 2 illustrates a data structure 200, at least parts of which may be suitable for implementing respective instances of the frames 112 and/or 118 as shown in FIG. 1. Assuming only for example that the encoder 108 and decoder 120 implement the Real-time Transport Protocol (RTP), the data structure 200 can include, for a given frame 112 and/or 118, a field 205 for the RTP standard header, and a field 210 that contains the data that is considered the payload of the frames 112 and/or 118. In addition, the data structure 200 can contain a field 215 for additional header data. The data contained in the field 215 may be considered an extension to the underlying protocol used by the encoder 108 and the decoder 120. In the example shown in FIG. 2, the protocol can be RTP, although it is understood that other protocols may be equally suitable.

Turning to the field 215 in more detail, FIG. 2 illustrates several examples of data that may be included in the field 215 for a particular frame 112 and/or 118. A sub-field 220 can contain one or more cache control bits. These cache control bits 220 can enable the encoder 108 to control and/or manage the caching of particular frames 112 and/or 118 by the decoder 120. These bits 220 can support frame recovery and synchronization operations between the encoder 108 and ones of the decoder 120. This frame caching operation is described in further detail below.

A sub-field 222 can indicate, for a given frame 112 and/or 118, what type of frame it is. FIG. 2 illustrates three types of frames, although it is understood that other types of frames may be implemented, and the implemented frames may be named or labeled differently than as described herein.

As shown in the sub-field 222, an I-frame represents an entire, self-contained frame of content, for example, audio or video. An I-frame is "free standing", and can be decoded and reproduced by the decoder 120 without reference to any other previous or future frames.

A P-frame represents a difference between a current state of the audio or video and a previous I-frame. Thus, a P-frame may be said to reference the previous I-frame. Because a P-frame contains data representing only the differences relative to this previous I-frame, the P-frame is typically much smaller than the I-frame. To conserve bandwidth across the network 114, it may be appropriate to utilize P-frames as much as possible. When the source content 110 exhibits relatively little motion over time, the encoder 108 may use a sequence of P-frames, because under such circumstances, the differences in successive frames are typically relatively small and readily represented by P-frames. However, when the source content 110 exhibits relatively great motion over time, or exhibits a substantial change of scene or context, the encoder 108 may use one or more I-frames to set the new scene or context. Also, the loss rate experienced by the workstation 102b and/or the decoder 120 may be reported to the workstation 102a and/or the encoder 108. In turn, the encoder 108 can consider the loss rate reported by the decoder 120 in determining whether to send I-frames or P-frames to the decoder 120. Additionally, the reported loss rate can be one factor in controlling the frame rate, bit rate, quality, and whether to send Super-P frames.

The sub-field 222 can also support an additional type of frame 112 and/or 118, which is referred to herein for convenience, but not limitation, as a Super P-frame. A Super P-frame is similar to a P-frame in that it defines a change in the content, relative to a previous state of the content. However, instead of referencing a previous frame, the Super P-frame references the contents of a cache that is maintained locally on the decoder 120. This caching operation is described in further detail below.

A sub-field 224 can contain an index or other type of unique identifier for a given frame 112 and/or 118. For example, the contents of the sub-field 224 can take the form of a sequence number for frames or packets, a unique timestamp, an offset or position of the given frame 112 and/or 118 within the context of the source content 110, a displacement of the given frame 112 and/or 118 relative to the beginning of the source content 110, or the like.

The contents of the sub-field 224, in whatever form, may be populated by the encoder 108 when encoding the source content 110 into the frames 112 at the workstation 104a. At the workstation 104b, the decoder 120 may reference the contents of the sub-field 224 for a given frame 118 when decoding and assembling a plurality of the frames 118 into the decoded content 122. More particularly, the contents of the sub-field 224 may enable the decoder 120 to assemble the frames 118 into an appropriate order when presenting the decoded content 122. Additionally, the decoder 120 can use the contents of the sub-field 224, at least in part, to determine if one or more frames 112 sent by the encoder 108 were lost during transmission through the network 114 to the workstation 104b.

As an example of the foregoing, the decoder 120 may receive a given sequence of frames 118 having identifiers 224 such as A, B, and D. However, the decoder 120 might expect these three frames 118 to have the identifiers 224 as A, B, and C. If the decoder 120 does not receive frame C in some amount of time, the decoder 120 may conclude that the frame 112 corresponding to expected frame C will never arrive, and was lost in the network 114. Accordingly, the decoder 120 may report to the decoder 120 that the packet C was lost, through for example the feedback channel 124.

A sub-field 226 can contain data pertaining to a color space conversion performed by the encoder 108 based on the characteristics or configuration of a particular decoder 120. Recall, from the discussion of FIG. 1 above, that particular instances of the decoder 120 can communicate information pertaining to their local color display capabilities or features back to the encoder 108, for example, via the feedback channel 124. In response to this feedback from particular decoders 120, the encoder 108 can specifically tailor the frames 112 that are sent to each of the particular decoders 120. Any data pertaining to specific color conversions performed by the encoder 108 on behalf of a given decoder 120 can be stored in the sub-field 226. For example, the source content 110 may be captured and presented to the encoder 108 in an illustrative range of 256 colors. However, if a given decoder 120 can only support and display 16 colors, it would not be useful to transmit frames 112 that support 256 colors to this given decoder 120. Accordingly, through data contained in the sub-field 226, the encoder 108 may instruct the decoder 120 how to convert the colors, as represented in the frame 112, into colors that are supported by the decoder 120. In addition to or instead of the foregoing, the encoder 108 may indicate, through data in the sub-field 226, how the encoder 108 has already converted the colors in the frame 112, for the benefit of the decoder 120.

A sub-field 228 can contain data pertaining to any pixel resolution conversions performed by the encoder 108 on behalf of a particular decoder 120. Recall from the above discussion of FIG. 1 that particular instances of the decoder 120 can communicate data such as their pixel resolution to the encoder 108, for example, via the feedback channel 124. Referring to the above discussion of sub-field 226 regarding color depth, the sub-field 228 can enable similar processing regarding pixel resolution. For example, the source content 110 may be captured and presented to the encoder 108 in a relatively high pixel density. However, one or more of the decoders 120 may not support this high pixel density, and different ones of the decoders 120 may support different pixel densities. Thus, the encoder 108 may optimize the pixel density of different frames 112 sent to different decoders 120, depending on the capabilities of the different decoders 120. Accordingly, the sub-field 228 can contain any information pertaining to any conversions in pixel resolutions performed by the encoder 108, or pertaining to any conversions that should be performed by the decoder 120 in processing the frames 118.

Having described the foregoing examples of the fields 205-215 and the sub-fields 220-228, it is understood that various implementations of the data structure 200 could include one or more of these example fields 205-215 or sub-fields 220-

228, or may contain additional data, fields, or sub-fields other than those illustrated in FIG. 2. In addition, the layout, names, and configuration of the fields or sub-fields of the data structure 200 are illustrative only, and are chosen only for convenience of illustration and description, and do not limit possible implementations of the data structure 200. It is further understood that given instances of the data structure 200 may be associated with particular frames 112, but each instance of the data structure 200 need not have populated each field and/or sub-field as shown in FIG. 2.

Figure 3:
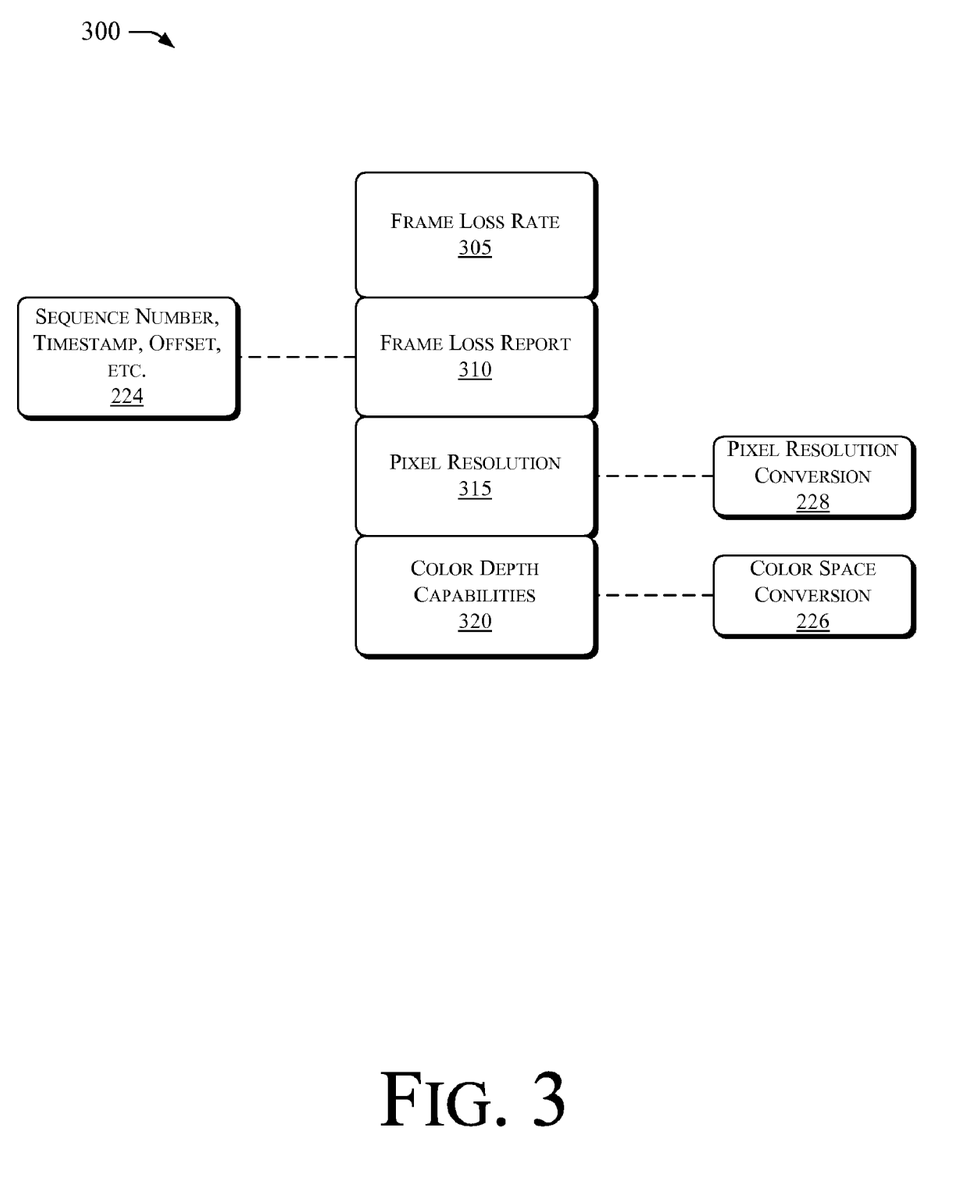
FIG. 3 is a block diagram illustrating a data structure, at least parts of which may be suitable for implementing respective instances of a feedback channel as shown in FIG. 1.

FIG. 3 illustrates a data structure 300, at least parts of which may be suitable for implementing respective instances of the feedback channel 124 as shown in FIG. 1. More particularly, data transfer from respective instances of the decoder 120 to the encoder 108 may be facilitated, at least in part, using the data structure 300.

Turning to the data structure 300 in more detail, a field 305 can contain data reporting a local frame or packet loss rate experienced by ones of the decoders 120. This loss rate may be expressed, for example, as a number of frames lost per unit of time, as experienced by a particular decoder 120. Given this information, the encoder 108 may choose how often to transmit I-frames or P-frames to the decoders 120. Also, this information may enable the encoder 108 to determine when and/or how often to direct or instruct the decoders 120 to cache particular frames 112/118. These caching operations are discussed further below in connection with FIGS. 4-6.

A field 310 can contain data reporting the loss of a particular frame 112/118. In reporting a frame loss, the decoder 120 can reference data such as that discussed previously regarding the sub-field 224 as shown in FIG. 2. Recall that the sub-field 224 can contain identification information for particular frames 112/118. For example, if the decoder 120 suspects that one or more frames 112 are missing, the decoder 120 might report a sequence of frames 118 that are actually received, so the encoder 108 can determine which frames 112 were lost. In another example, the decoder 120 could estimate or determine the identification information for the suspected missing frames 112.

A field 315 can contain data representing a local pixel resolution supported by a particular decoder 120. In response to this data 315 as reported by the decoder 120, the encoder 108 can transform the pixel resolution of the frames 112/118 sent to the decoder 120, can instruct the decoder 120 how to transform the pixel resolution of the frames 112/118, or can perform other related processing. Any of the foregoing can be performed in connection with the sub-field 228 shown in FIG. 2.

A field 320 can contain data representing a local color depth supported by a particular decoder 120. In response to this data 315 as reported by the decoder 120, the encoder 108 can transform the color depth of the frames 112/118 sent to the decoder 120, can instruct the decoder 120 how to transform the color depth of the frames 112/118, or can perform other related processing. Any of the foregoing can be performed in connection with the sub-field 226 shown in FIG. 2.

Having described the foregoing examples of the fields 305-320, it is understood that various implementations of the data structure 300 could include one or more of these example fields 305-320, or may contain additional data, fields, or sub-fields other than those illustrated in FIG. 3. In addition, the layout, names, and configuration of the fields of the data structure 300 are illustrative only, and are chosen only for convenience of illustration and description, and do not limit possible implementations of the data structure 300. It is further understood that given instances of the data structure 300 may be associated with particular instances of data transmitted from the decoders 120 to the encoder 108. However, each instance of the data structure 300 need not have populated each field as shown in FIG. 3.

Data Flows

The tools described herein may implement data flows that are suitable for performing feedback and frame synchronization between media encoders and decoders. An illustrative data flow is now described in connection with another operating environment.

Figure 4:
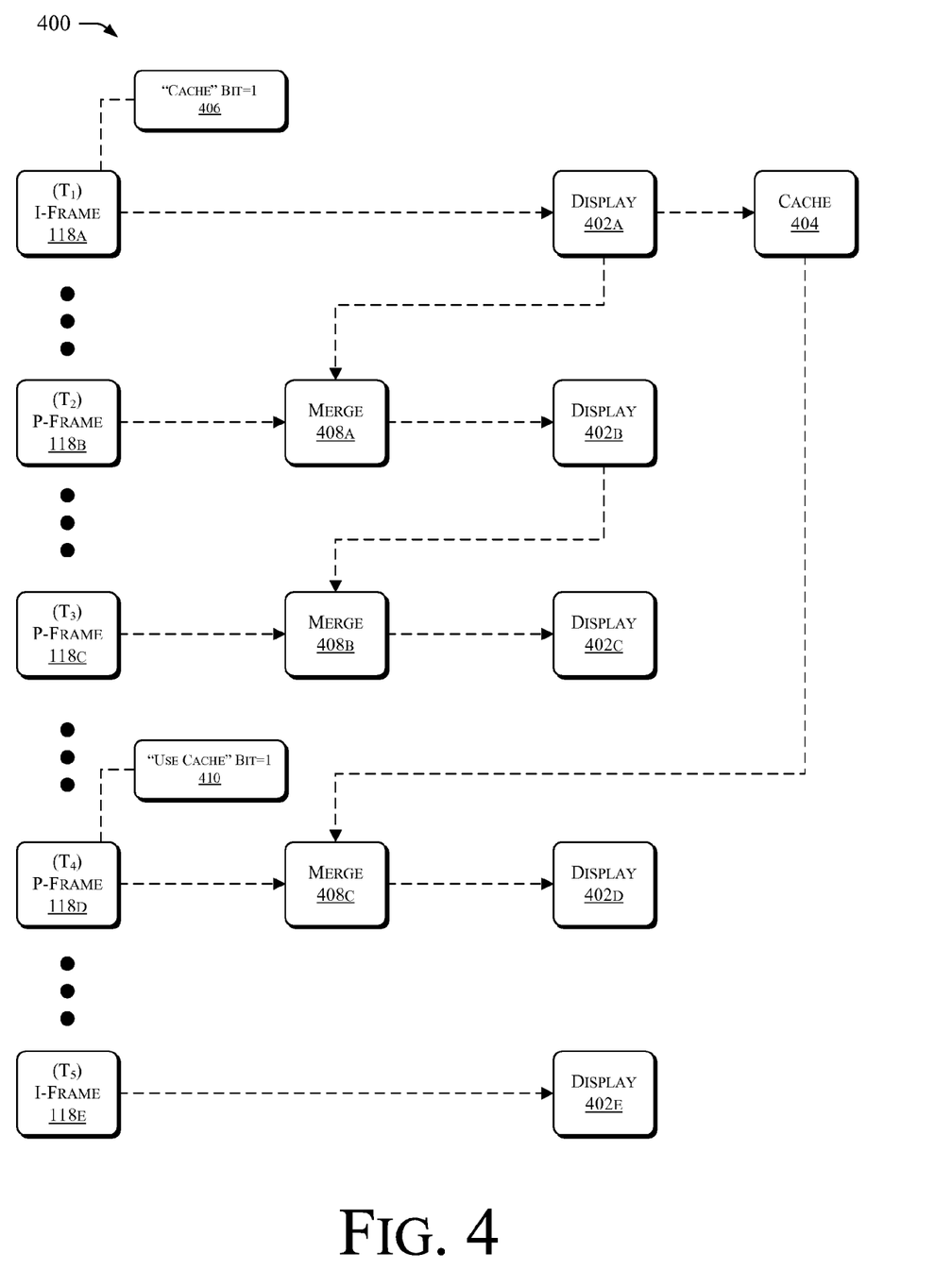
FIG. 4 is a block diagram illustrating an operating environment for receiving frames, merging a new frame with a previous display to produce an updated display, caching a frame, and merging a new frame with the contents of a cache to produce an updated display.

FIG. 4 illustrates an operating environment 400 for receiving frames 118, merging a new frame 118 with a previous display to produce an updated display, caching a frame 118, and merging a new frame 118 with the contents of the cache to produce an updated display. The operating environment 400 may be implemented, at least in part, by the workstation 104b and/or the decoder 120, although aspects of the operating environment 400 may also be implemented by other components or tools as well.

Assume that at a time ($T_1$), a frame 118a is received. Recall that frames 118 can be associated with respective instances of the data structure 200, as discussed above in connection with FIG. 2. Assume further that a field 222 of the data structure 200 for the frame 118a indicates that the frame 118a is an I-Frame. Because the frame 118a is an I-Frame, the frame 118a can be presented directly on a display 402 associated with, for example, the workstation 104b. For convenience, the display 402 as it would stand when presenting the I-Frame 118a is denoted as display 402a in FIG. 4.

Recall from the discussion of FIG. 2 that the data structure 200 for the frames 112/118 can include the cache control bits 220. Assume for the purposes of describing the operating environment 400 that the data structure 200 includes two cache control bits 220. A first cache control bit may be labeled "Cache", and at least a second cache control bit may be labeled "Use Cache". Either or both of these bits may be set or active for a given frame 118.

Turning first to the "Cache" bit, when this bit is set for a given frame 112/118, this bit directs the decoder 120 to store the frame 112/118, and/or the display resulting from that frame 112/118, into a cache 404 maintained locally by the workstation 104b and/or the decoder 120. Thus, in the example shown in FIG. 4, assume that the I-Frame 118a has the "Cache" bit set or active, as indicted in block 406. Accordingly, the I-Frame 118a would be presented as the display 402a, and stored in the cache 404.

Some implementations of the operating environment 400 may cache all instances of I-Frames 112/118 by default. Other implementations of the operating environment 400 may cache only those I-Frames 112/118 that have their "Cache" bits set or active.

Assume that at time ($T_2$), a frame 118b arrives, and that its frame type 222 indicates that it is a P-Frame. Recall that a P-Frame expresses the difference between the current state of the source content 110 and some previous reference frame. Accordingly, the contents of the frame 118b are merged with the previous display 402a, as represented by merge block 408a. The merge 408a results in an updated display 402b.

Having described the processing of the P-Frame 118b, it is noted generally that a P-Frame 118 may have its Cache" bit set or active. In such a case, the contents of the P-Frame 118 itself may be stored in the cache 404, in some implementations of the operating environment 400. In other implementations, the display (e.g., display 402b) resulting from the merge of the P-Frame (e.g., frame 118b) may be cached.

Assume that at time ($T_3$), a frame 118c arrives, and that its frame type 222 indicates that it is a P-Frame. In this case, the contents of the frame 118c are merged with the previous display 402b, as represented by merge block 408b. The merge 408b results in an updated display 402c. The foregoing, however, assumes that the frame 118c actually arrives at the operating environment 400. If the frame 118c fails to arrive at the operating environment 400, there will be no updated display 402c. Further, by the time that the operating environment 400 detects the frame loss, the previous display 402b may have expired or otherwise become outdated. In this event, the encoder 108 may be notified of a frame loss. See, e.g., block 310 and related discussion of FIG. 3.

In response to the frame loss report 310, the encoder 108 may send a replacement P-Frame 118d. Assume that the operating environment 400 receives this replacement P-Frame 118d at time ($T_4$). As indicated by the block 410, the cache control bits 220 for the replacement P-Frame 118d can have its "Use Cache" bit set or active. This directs the operating environment 400 to merge the current P-Frame 118d with the contents of the cache 404, rather than the previous display. This merge-from-cache is represented generally by the merge block 408c.

Because this replacement P-Frame 118d is encoded relative to a cached reference frame, rather than the previous I-Frame, the P-Frame 118d is referred to herein as a Super P-Frame, as discussed above. The encoder 108 encodes the Super P-Frame 118d based on the cached reference, and thus the Super P-Frame 118d is much smaller than a replacement I-Frame 118 would be. Thus, sending the Super P-Frame 118d to compensate for the frame loss consumes less network bandwidth than sending a replacement I-Frame 118.

In some implementations, the encoder 108 may not send the Super P-Frame 118d if the corrupted frame is sufficiently close to the next I-Frame 118e that will arrive at the decoder 120. In such implementations, the decoder 120 may await the next I-Frame 118e. The decoder 120 may be configured with one or more settings that specify how close the corrupted frame should be relative to the next I-Frame 118e for this processing to occur.

After the Super P-Frame 118d is merged with the contents of the cache 404, the display 402d results. FIG. 4 also depicts the arrival of a new I-Frame 118e at time ($T_5$), resulting in a new display 402e.

It is noted that FIG. 4 shows one cache 404 only for convenience of illustration and description. Additional caches 404 could be provided by the encoder 108 and/or the decoder 120, such that multiple reference frames 112/118 can be stored and retained by the encoder 108 and/or the decoder 120. These multiple reference frames 112/118 may be useful in situations wherein one or more of the cached frames 112/118 may have been corrupted or lost. Where multiple caches 404 are implemented, additional cache control bits (e.g., cache control bits 220 in FIG. 2) may be implemented as appropriate to dictate or indicate which cache 404 was used to encode a given replacement frame 112/118.

Additionally, it is noted that the cache control bits 220 provide a means for enabling the encoder 108 to instruct the decoder 120 in how to handle caching and related synchronization of replacement frames 112/118. Finally, the reference frames cached at the encoder 108 and the decoder 120, and the replacement frames 112/118 encoded therefrom, provide a means for synchronizing the processing of the encoder 108 and the decoder 120.

Process Flows

The tools as described herein can implement various process flows to perform feedback and frame synchronization between media encoders and decoders. Examples of such process flows are now described.

Figure 5:
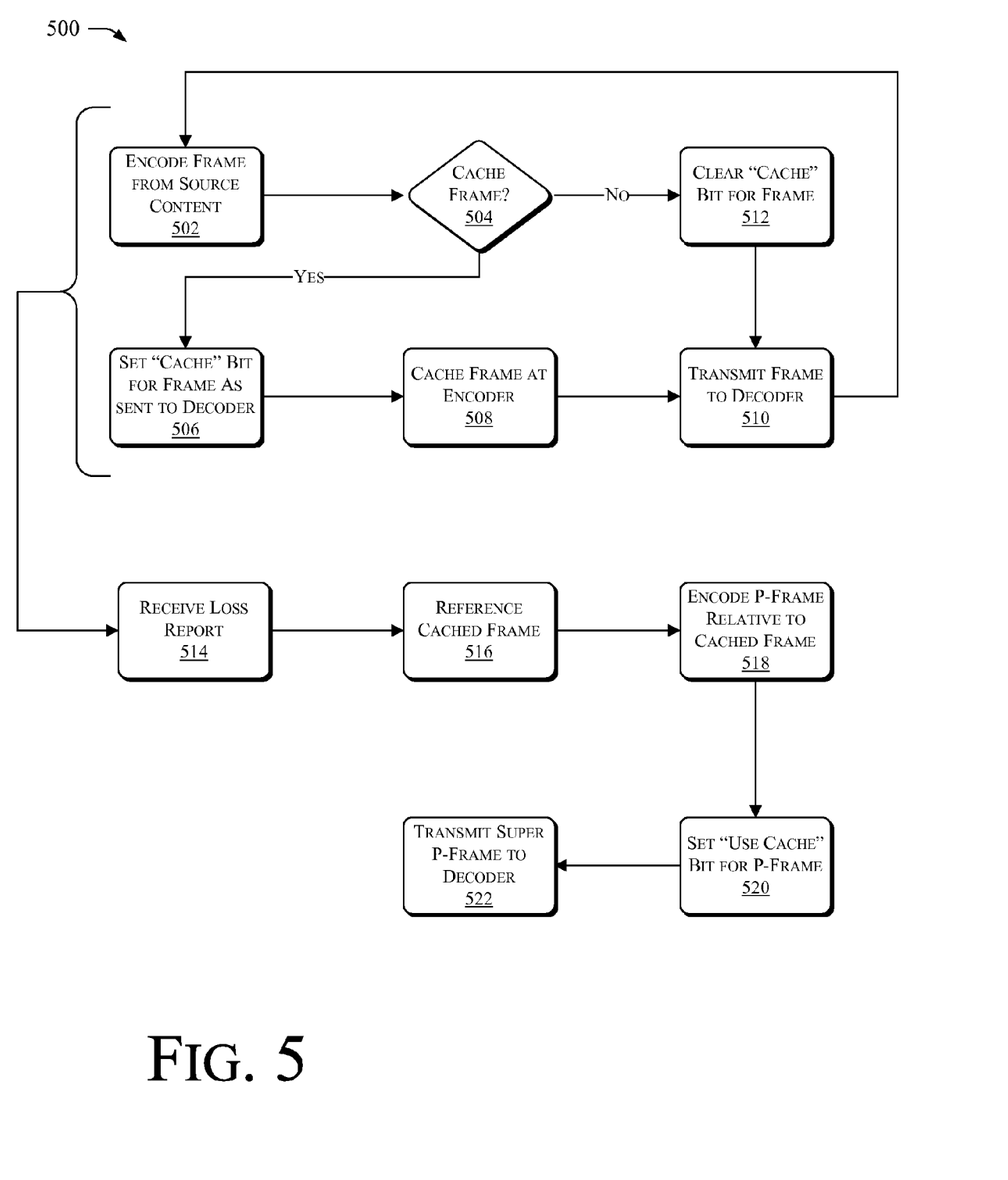
FIG. 5 is a flow diagram illustrating a process flow that may be performed to encode frames and to respond to a frame loss report.

FIG. 5 illustrates a process flow 500 that may be performed to encode frames and to respond to a packet loss report. The process flow 500 is described here in connection with the encoder 108. However, it is understood that the process flow 500 may be implemented on devices or components other than the encoder 108 without departing from the spirit and scope of the description herein.

Block 502 encodes one or more frames from the source content 110. Block 504 evaluates whether to cache the current frame 112 for possible later reference. If the frame 112 is to be cached, block 506 sets the "Cache" bit for the current frame 112. Recall that the "Cache" bit may be implemented as part of the cache control bits 220 shown in FIG. 2. Block 508 caches the current frame 112 for later reference. For example, the current frame 112 may be cached by the encoder 108. Block 510 transmits the current frame 112 to the decoder 120. Illustrative processing of the frame 112 at, for example, the decoder 120 is described in connection with FIG. 6 below.

Returning to block 504, if the current frame 112 is not to be cached, then block 512 clears the "Cache" bit for this frame 112. In some instances, the "Cache" bit may be initialized to a set or clear state when the frame 112 is instantiated. In such cases, blocks 512 or 506 may not be performed, if it is not necessary to change the state of the "Cache" bit from its initialized state.

After block 512, the process flow 500 proceeds to block 510 as described above. After block 510 is performed, the process flow 500 can return to block 502 to process the next frame 112 into which the source content 110 is encoded. It is understood that the process flow 500 may loop through blocks 502-512 as appropriate to encode the source content 110 into suitable frames 112.

At any time during the processing of blocks 502-512, block 514 can receive a frame loss report 310. Block 514 can occur at any point within the process flow 500. The process flow 500 may also test for and respond to the receipt of the frame loss report 310 at any point relative to blocks 502-512. Additionally, the process flow 500 may implement block 514 as an interrupt, branch from some point within blocks 502-512 to service the interrupt, perform blocks 516-522 (described below) as an interrupt service routine, and return to the point in blocks 502-512 at which the interrupt was received. For convenience of illustration, FIG. 5 shows the process flow 500 branching to block 514 when the frame loss report 310 is received, regardless of where the process flow 500 is within blocks 502-512.

Block 516 references the frame that was cached previously in block 508. Block 518 encodes a new P-Frame relative to or referencing the cached frame. Block 520 sets the "Use Cache" bit of the new P-Frame, if this bit is not already set. Recall that the cache control bits 220 shown and discussed in FIG. 2 can include a "Use Cache" bit, which directs, for example, the decoder 120 to reference the contents of the cache 404 rather than the current display 402, when updating the current display 402. This new P-Frame is referred to herein for convenience only as a Super P-Frame. Block 522 transmits the Super P-Frame to the decoder 120 to allow the latter to compensate for the loss of the frame reported in block 514.

Figure 6:
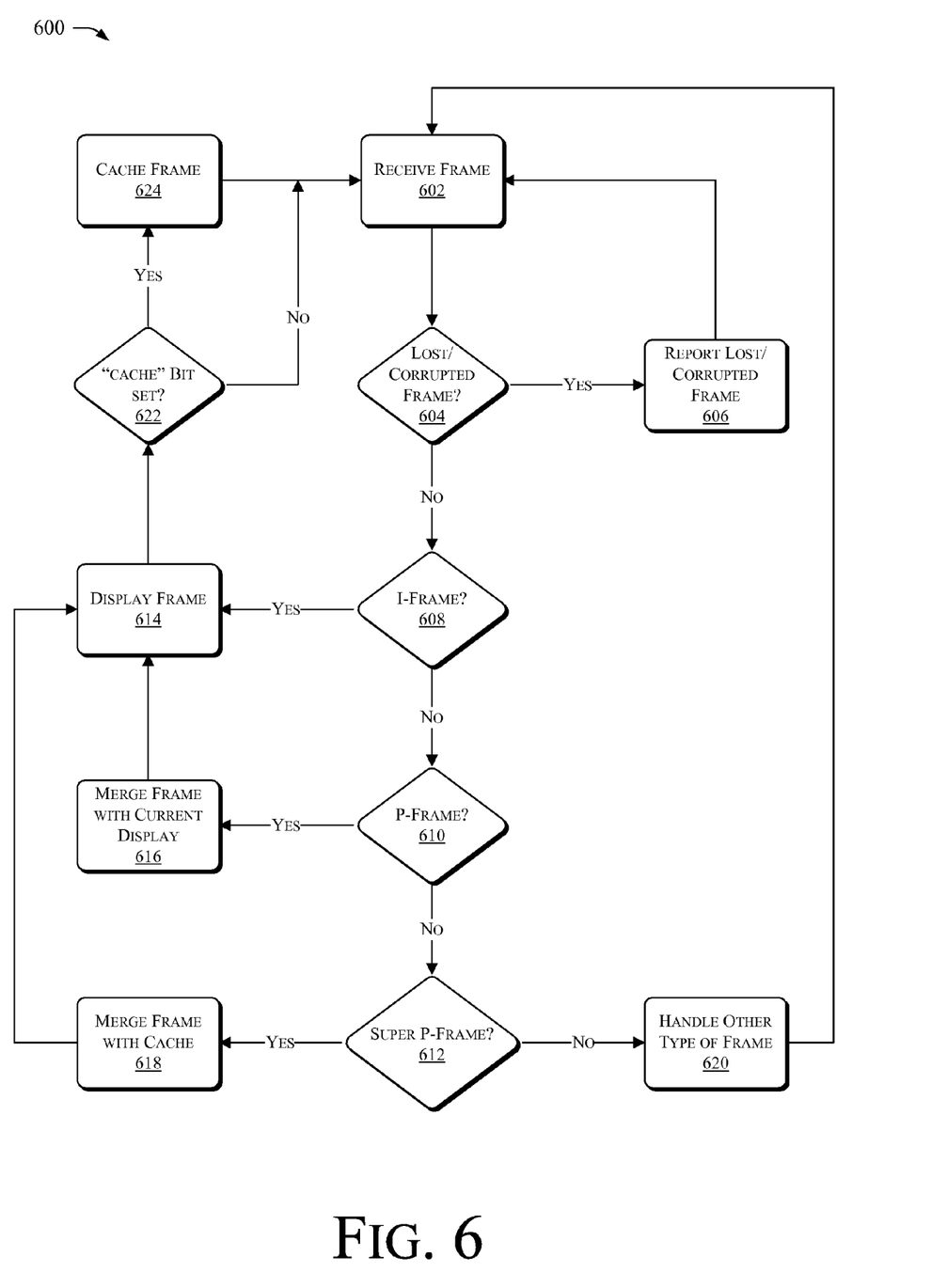
FIG. 6 is a flow diagram illustrating a process flow for processing a frame as received by, for example, the decoders.

FIG. 6 illustrates a process flow 600 for processing a frame as received by, for example, the decoder 120. While the process flow 600 is described herein in connection with tools such as the decoder 120 and the encoder 108, other implementations of the process flow 600 could also be implemented with other tools without departing from the spirit and scope of the description herein.

Block 602 receives a frame 118, as transmitted by, for example, block 510 shown in FIG. 5. Block 604 tests whether the received frame 118 is corrupted, or whether a different frame 118 was expected. Regarding frame corruption, block 604 can test for corruption by, for example, evaluating a checksum or other error-detection and correction scheme implemented by the decoder 120 and/or encoder 108. Regarding frame loss, recall that frames 118 can be associated with respective instances of the data structure 200, described above in FIG. 2. The data structure 200 can contain a field 224 for sequencing or otherwise uniquely identifying the frame 118. Using, for example, this field 224, block 604 can test whether the current frame 118 is the expected successor to a previous frame 118. If not, then the expected successor frame 118 may have been lost.

If the current frame 118 is corrupted or is not expected, block 606 reports the lost or corrupted frame. The report issued from block 606 can correspond to the report received in block 514 shown in FIG. 5 and to the frame loss report 310 shown in FIG. 3.

If the current frame 118 is not corrupted and is the expected successor frame, then blocks 608, 610, and 612 can test what frame type the frame 118 is. Recall that the data structure 200 can contain a sub-field 222 indicating a frame type. Block 608 tests whether the frame 118 is an I-Frame, block 610 tests whether the frame 118 is a P-Frame, and block 612 tests whether the frame 118 is a Super P-Frame.

Turning to block 608, if the frame 118 is an I-Frame, then block 614 can display the frame 118 directly, without reference to the current display or any other frame 118. In block 610, if the frame 118 is a P-Frame, then block 616 updates the current display by merging it with the frame 118. Block 614 then presents the updated display. In block 612, if the frame 118 is a Super P-Frame, then block 618 updates the display by merging it with the contents of a cache, such as the cache 404 shown in FIG. 4. Recall that a Super P-Frame can be indicated or detected by a "Use Cache" bit being set or activated. Block 614 then presents the updated display.

From block 612, if the frame 118 is neither an I-Frame, a P-Frame, nor a Super P-Frame, then block 620 can process this other type of frame. Afterwards, the process flow 600 can return to block 602 to await the next frame 118.

From block 614, block 622 tests whether the "Cache" bit is set for the frame 118. If so, block 624 stores the frame 118 in a cache, such as for example the cache 404 shown in FIG. 4. Block 602 then awaits the arrival of the next frame 118. Returning to block 614, if the "Cache" bit is not set for the frame 118, block 624 can be bypassed, and block 602 then awaits the arrival of the next frame 118.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain flow diagrams described and illustrated herein, it is noted that the processes and sub-processes depicted therein may be performed in orders other than those illustrated without departing from the spirit and scope of the description herein.

The invention claimed is:

1. A method comprising at least:
encoding at least one frame based on source content;
determining whether to cache the frame at an encoder and at least one decoder; and
encoding at least one cache control bit associated with the frame in response to the determining.

2. The method of claim 1, further comprising caching the frame at the encoder.

3. The method of claim 1, wherein encoding at least one cache control bit includes setting the cache control bit to indicate that the frame is to be cached at the encoder and the decoder.

4. The method of claim 1, further comprising transmitting the frame to the at least one decoder.

5. The method of claim 1, further comprising receiving data representing a pixel resolution supported by the decoder.

6. The method of claim 5, wherein encoding at least one frame is performed based on the data representing the pixel resolution of the decoder.

7. The method of claim 1, further comprising receiving data representing a color depth supported by the decoder.

8. The method of claim 7, wherein encoding at least one frame is performed based on the data representing the color depth of the decoder.

9. The method of claim 1, further comprising receiving a loss report indicating that at least one additional frame was lost or corrupted after transmission from the encoder.

10. The method of claim 9, further comprising referencing at least one cached frame in response to receiving the loss report.

11. The method of claim 9, further comprising encoding a replacement frame for the additional frame based on at least one cached reference frame.

12. The method of claim 9, further comprising transmitting a replacement frame for the additional frame, the replacement frame being encoded based on at least one cached reference frame.

13. The method of claim 9, further comprising setting at least one additional cache control bit associated with the replacement frame, wherein the additional cache control bit indicates that the replacement frame is encoded based on a cached reference frame.

14. A method comprising:
receiving a frame encoded from source content;
determining whether to cache the frame;
decoding the frame; and
determining at least one of:
whether the frame is corrupted; or
whether at least one additional frame is missing.

15. The method of claim 14, further comprising reporting at least one lost or damaged frame.

16. The method of claim 14, wherein determining whether to cache the frame includes testing at least one cache control bit associated with the frame.

17. The method of claim 14, further comprising caching the frame.

18. The method of claim 14, further comprising determining whether the frame is encoded based on a cached reference frame by testing at least one cache control bit associated with the frame.

19. The method of claim 14, further comprising merging the frame with at least one cached reference.

20. A method comprising:
receiving a frame encoded from source content;
determining whether to cache the frame by testing a cache control bit associated with the frame; and
decoding the frame.

* * * * *